United States Patent Office.

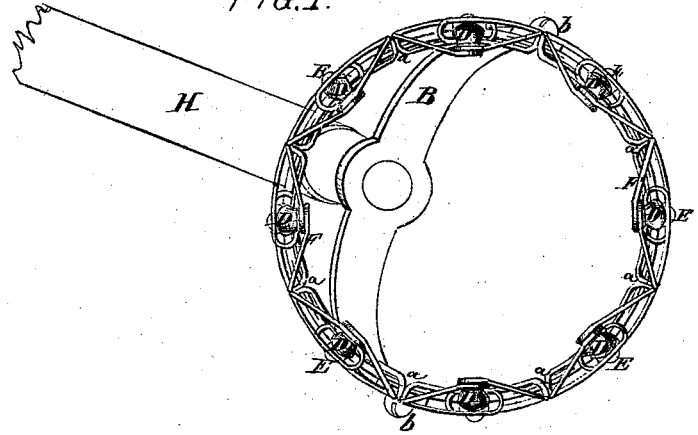
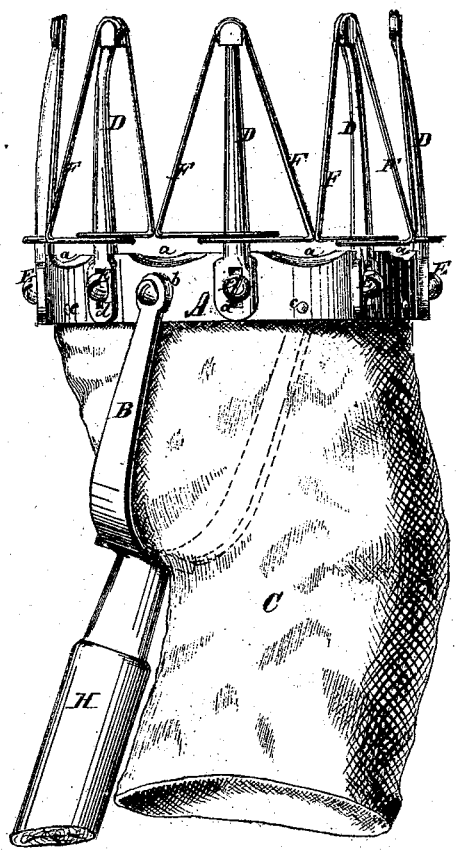

JOHN BOWLES, OF AUGUSTA, GEORGIA.

Letters Patent No. 93,667, dated August 17, 1869.

---

IMPROVEMENT IN FRUIT-GATHERERS.

---

The Schedule referred to in these Letters Patent and making part of the same.

---

*To all whom it may concern:*

Be it known that I, JOHN BOWLES, of Augusta, Richmond county, Georgia, have invented a new and useful Improvement in Fruit-Gatherers; and that the following is a sufficiently full and exact description to enable one skilled in the art to make and use my said invention, reference being had to the accompanying drawings, which form part of this specification.

My invention relates to that class of fruit-gatherers which consists, essentially, of a cylinder or ring, of metal or other rigid material, mounted (while in use) upon a long pole, and employed to sever the fruit from the tree, and deliver it to a long sack or hose, of cloth or other flexible material, by which it may be conducted to the ground, or to a basket or other receptacle, or into the hand of the operator, without bruising.

The nature of my improvement consists in forming or providing the upper edge of the ring, to which the conducting-hose is attached, with a sharp knife, for the purpose of cutting the stems of the fruit; and, further, in the employment or use of a circular range of guards, which, projecting beyond the edge of the knife, effectually prevent the fruit from coming in contact therewith, but permit the passage of the stems, and afterward confine them in close proximity to the knife, until they are severed; and, finally, in an improved device for attaching the ring or annular knife.

In order that my invention may be clearly understood, I will now proceed to describe it with reference to the accompanying drawings, in which—

Figure 1 is a plan or top view of my improved fruit-gatherer.

Figure 2 represents an elevation of the same, the upper portions only of the supporting-handle and conducting-hose being shown.

Similar letters of reference indicate corresponding parts in both views.

A represents the cylinder or ring, formed, at $a\ a\ a$, with sharp edges or knives, for severing the fruit-stems.

The annular knife A is supported by a yoke, B, hinged to it, at $b\ b$, and mounted upon a handle, H, which may be of any required length, to enable the operator to reach the fruit upon the tree from the ground or other convenient stand-point.

C represents a portion of the conducting-hose, of cloth or other flexible material, attached all around the annulus A by rivets $c\ c$, or other means.

D D D are standards, attached to the annular knife A by set-screws E, which occupy slots $d\ d$, so that the standards can be adjusted longitudinally, for the purpose to be presently explained.

F F represent guards, of wire or other flexible material, and of triangular form, each of which is attached, at its apex, to the top of one of the standards, while its free lower ends are bent inward, overlapping each other, and embracing the standard, in such a manner that a small object, such as one or more stems of apples, cherries, or other fruit, being drawn downward into the converging space between two adjacent guards, will press apart the yielding lower parts of the said guards, and pass between them to the knife, $a$, below; but the upper part of the guards, where they are more distant from each other, and are attached to the standards, being comparatively unyielding, will effectually prevent the entrance, between the guards, of the fruit itself, and the latter will thus be perfectly protected from contact or injury by the knives $a\ a$.

In using the device, the standards D are so adjusted that the horizontal parts of the guards will be in such proximity to the knives $a\ a$ as to admit the stems of whatever fruit is to be gathered, with but little space to spare. Thus, if apples or other large fruit are to be gathered, a wider space will be required; but if small fruits, such as cherries, are to be gathered, the space should be less.

A cluster of cherry-stems, entering between the distant upper parts of the guards, will be drawn closely together as they descend, (or as the instrument is pressed upward,) and, pressing apart the yielding lower portions of the guards, will pass directly against the knife, and be instantly severed, without the possibility of injury to the fruit itself.

All descriptions of fruit can be safely gathered in this manner, and, passing through the ring A, into the conductor C, are thereby conveyed to the ground, or to the hand of the operator, or to any receptacle, without injury.

Having thus described my invention, the following is what I claim as new, and desire to secure by Letters Patent:

1. I claim the guards F, secured, at top, to the standards D, and adapted to yield at their lower parts, substantially as and for the purposes specified.

2. I claim the annular knife A $a$, in combination with guards F, to prevent the contact of the fruit therewith, substantially as set forth.

3. I claim the yoke B, hinged to the ring A, substantially as described, so that the latter may be presented to the fruit at any proper angle.

J. BOWLES.

Witnesses:
 OCTAVIUS KNIGHT,
 FREDK. M. KLAUCKE, Jr.